US012312216B2

(12) United States Patent
Rossborough, III et al.

(10) Patent No.: US 12,312,216 B2
(45) Date of Patent: May 27, 2025

(54) SYNTHETIC LIFTING SLINGS AND RELATED METHODS

(71) Applicant: Stren-Flex, LLC, Simpsonville, SC (US)

(72) Inventors: Roderick G Rossborough, III, North Palm Beach, FL (US); Trevor J. Waycott, Simpsonville, SC (US)

(73) Assignee: Stren-Flex, LLC, Simpsonville, SC (US)

( * ) Notice: Subject to any disclaimer, the term of this patent is extended or adjusted under 35 U.S.C. 154(b) by 926 days.

(21) Appl. No.: 17/192,331

(22) Filed: Mar. 4, 2021

(65) Prior Publication Data

US 2021/0276836 A1 Sep. 9, 2021

Related U.S. Application Data

(60) Provisional application No. 62/985,030, filed on Mar. 4, 2020.

(51) Int. Cl.
*B66C 1/12* (2006.01)
*D07B 1/04* (2006.01)

(52) U.S. Cl.
CPC .................. *B66C 1/12* (2013.01); *D07B 1/04* (2013.01); *D07B 2201/2055* (2013.01); *D07B 2201/20903* (2015.07); *D07B 2201/2092* (2013.01); *D07B 2501/2015* (2013.01)

(58) Field of Classification Search
CPC .. B66C 1/12; B66C 1/122; B66C 1/18; D07B 1/025; D07B 1/04; D07B 2201/2015; D07B 2201/2055; D07B 2201/2056; D07B 2201/20903; D07B 2201/2092
USPC ........................................................... 294/74
See application file for complete search history.

(56) References Cited

U.S. PATENT DOCUMENTS 5,238,278 A * 8/1993 Kamper .................... B66C 1/18 139/408
7,422,255 B2 * 9/2008 Hess ...................... A63B 29/02 294/148
8,322,765 B2 * 12/2012 St. Germain ............. B66C 1/12 57/231
8,540,295 B2 * 9/2013 Babinchak ................ B66C 1/18 294/74
2015/0337490 A1 * 11/2015 Burdette, III ........ D03D 1/0043 28/142

FOREIGN PATENT DOCUMENTS

WO WO-2019231946 A1 * 12/2019

* cited by examiner

*Primary Examiner* — Stephen A Vu
(74) *Attorney, Agent, or Firm* — Michael Best & Friedrich LLP

(57) ABSTRACT

Lifting slings for use in rigging projects to aid in the lifting of heavy objects and related methods are provided herein. A lifting sling can include an inner core comprising continuous synthetic filaments that form one or more load-bearing endless loops. The lifting sling can also include a tubular outer cover loosely surrounding the inner core so that the filaments of the core are movable relative to each other and to the outer cover.

17 Claims, 9 Drawing Sheets

THIRD PARTY HEXBAR DESTRUCTIVE TESTING

NEW TUBULAR WOVEN OUTER COVER FABRIC
HEXBAR ABRASION TEST
182,092 CYCLES TO DESTRUCTION

STANDARD ROUNDSLING OUTER COVER FABRIC HEXBAR ABRASION TEST
55,913 CYCLES TO DESTRUCTION

CONVENTIONAL OUTER COVER FABRIC
AND
NEW TUBULAR WOVEN FABRIC AS DISCLOSED IN THE PRESENT APPLICATION FOR USE AS AN OUTER COVER BEFORE TESTING OF 50,000 CYCLES USING ASTM TEST METHOD D6770-07

CONVENTIONAL OUTER COVER FABRIC
AND
NEW TUBULAR WOVEN FABRIC
AFTER 50,000 CYCLES USING ASTM TEST
METHOD D6770-07

SYNTHETIC LIFTING SLINGS AND RELATED METHODS

RELATED APPLICATION

The presently disclosed subject matter claims the benefit of U.S. Provisional Patent Application Ser. No. 62/985,030, filed Mar. 4, 2020, which is incorporated herein by reference in its entirety.

TECHNICAL FIELD

The present subject matter relates to slings used in rigging projects to aid in the lifting of heavy objects. In particular, the present subject matter relates to water and oil resistant synthetic lifting slings use as part of a rigging to lift heavy objects to move the heavy objects, for example, in construction projects, and methods related to the lifting slings.

BACKGROUND

When moving heavy objects, for example, objects that can weigh about 1,000 to more than about 150,000 pounds, rigging experts are called in to handle the complicated engineering work and planning. A major tool at their disposal are slings used in the rigging to help bare the load of heavy and often cumbersomely shaped objects. In modern day rigging operations, wire rope slings made of a plurality of metal strands twisted together and secured by large metal sleeves or collars have been traditional used within the industry. While providing great strength, these metal wire slings are often stiff and inflexible.

The rigging industry has turned to the use of synthetic fiber slings to replace metal slings in many circumstances. Synthetic slings are usually comprised of a core made of twisted strands of synthetic fiber and an outer cover that protects the core from physical damage. One of the more popular designs of synthetic slings is a roundsling in which the core forms a continuous loop and the sling has a circular or oval-shaped appearance. These synthetic slings have a very high strength-to-weight ratio which provides for lighter, more flexible and even stronger slings than their heavier and bulkier metal counterparts.

As thousands of roundslings are being used on a daily basis in a broad variety of heavy load lifting applications and safety applications, the slings are subjected to harsh environmental conditions including extreme temperature and moisture conditions. In such conditions, the synthetic slings can absorb water or other liquids, which can cause problems. Moisture that penetrates the outer cover can seep into the synthetic core. Depending on the synthetic fibers used in the core, the moisture can cause damage to and have a potential to weaken the synthetic core. For example, saturated slings exposed to cold temperatures can freeze, thereby eliminating the flexibility of the slings and possibly damaging the fibers in the synthetic core. Additionally, saturated slings are much heavier for an operator to effectively lift and maneuver. Due to the dangerous nature of lifting such heavy, massive objects, the risk of using possibly damaged slings is too high and saturated slings are often not recommended for use in rigging operations.

Additionally, the outer cover of these synthetic slings can be subjected to severe wear and tear due to the nature of rigging operations including the harsh environmental conditions where these operations occur and the slings having to lift heavy loads that are often oddly shaped such that abrasion of the outer cover more readily occurs. In conventional synthetic slings, the outer covers are generally comprised of strong yarns woven in a traditional plain weave construction. The wear and tear of rigging operations can cause abrasion failures in these conventional outer covers over time. Once abrasions start to show significantly on the outer cover of the slings, use of these conventional slings in rigging operations should cease, once again due to the dangerous nature of lifting such heavy, massive objects in such rigging operations.

Therefore, there exists the need to provide a synthetic sling that comprises an outer cover that is resistant to absorption of water and other liquids and can be effectively used in all conditions and that also provides better wear and abrasion resistance to permit longer use in rigging operations. It would, therefore, be beneficial to provide a synthetic sling which maintains its lightweight and flexible characteristics in harsh environments in which the sling is exposed to extreme moisture conditions and provide better wear and abrasion resistance than conventional slings.

SUMMARY

The present subject matter provides slings used to aid in the lifting of heavy objects and related methods. In particular, synthetic lifting slings that are water and oil resistant and/or wear and abrasion resistant are provided for use in rigging operations to aid in lifting and move heavy objects, for example, in construction projects. Methods related to the manufacture and use of such synthetic lifting slings as disclosed herein are also provided.

Thus, it is an object of the presently disclosed subject matter to provide water and oil resistant synthetic lifting slings that can remind dry and thereby safer to use when lifting heavy objects in a variety of conditions and to provide wear and abrasion resistant synthetic lifting slings that can better withstand the wear and tear of rigging operations as well as methods related to such lifting slings. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

Figure 1:
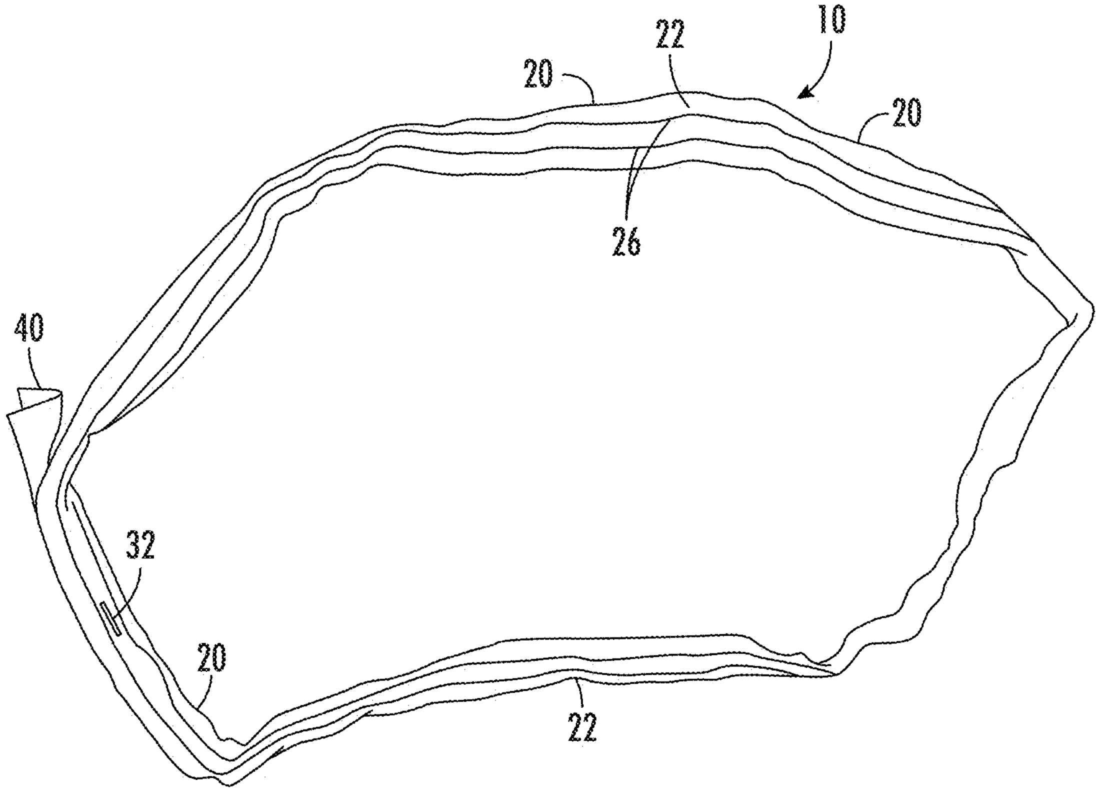
FIG. 1 illustrates a perspective view of an embodiment of a lifting sling according to the present subject matter.
Figure 2:
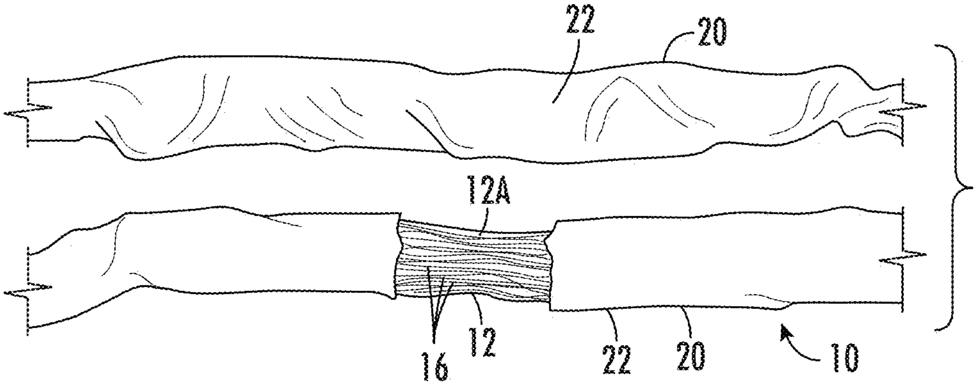
FIG. 2 illustrates a perspective view of a portion of an embodiment of a lifting sling partially dissected showing an embodiment of an inner core of the lifting sling according to the present subject matter.

Repeat use of reference characters in the present specification and drawings is intended to represent the same or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. Thus, it is intended that the present subject matter cover such modifications and variations as come within the scope of the appended claims and their equivalents. It is to be understood by one of ordinary skill in the art that the present discussion is a description of exemplary embodiments only, and is not intended as limiting the broader aspects of the present subject matter, which broader aspects are embodied in exemplary constructions.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

Similarly, when a layer, coating, substrate or component is being described in the present disclosure as “on” or “over” another layer, coating, substrate, or component, it is to be understood that such features can either be directly contacting each other or have another feature between them, unless expressly stated to the contrary. Thus, these terms are simply describing the relative position of the features to each other and do not necessarily mean “on top of” since the relative position above or below depends upon the orientation of the device to the viewer.

Except for the images provided in the Figures, embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of the subject matter and are not intended to limit the scope of the subject matter disclosed herein.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5 as examples.

The term “synthetic fibers” is used herein to mean chemically produced fibers, including single fiber filaments, as distinguished from truly natural fibers, such a silk, cotton, flax, or wool. Synthetic fibers can include, but are not necessarily limited to, fibers produced from fiber-forming substances that may be polymers, such as thermoplastic polymers, synthesized from chemical compounds or modified or transformed natural polymers.

The term “filament” is used herein to mean one or more fibers of an indefinite or extreme length such as those extruded from thermoplastic polymers or a yarn comprising one or more such fibers.

The term “thermoplastic” is used herein to mean any material formed from a polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

Referring to FIG. 1, a lifting sling, generally designated 10 is provided in accordance with the present disclosure. The lifting sling 10 comprises a roundsling, however, other types of slings may be constructed in the same or similar manner as covered by subject matter herein including, but not limited to, eye and eye roundslings, bridled roundslings, or the like. FIG. 1 specifically shows a single-path roundsling, but the principles disclosed herein may be applied to other slings, whether single or multiple-path, which have a cover or sleeve which surrounds the core. Generally, such slings are constructed to have a high lifting and break strength, lighter weight, high temperature resistance and high durability, compared to wire rope or metal chain slings. The slings 10 can be used for many applications relating, but not limited, to construction, plant and equipment operations, ship building, oil drilling, other rigging operations, and the like. Embodiments of such slings 10 are now manufactured and sold along with other slings under the trademark SIMIAN by Stren-Flex, LLC, which has a principal place of business in Simpsonville, South Carolina.

Figure 3:
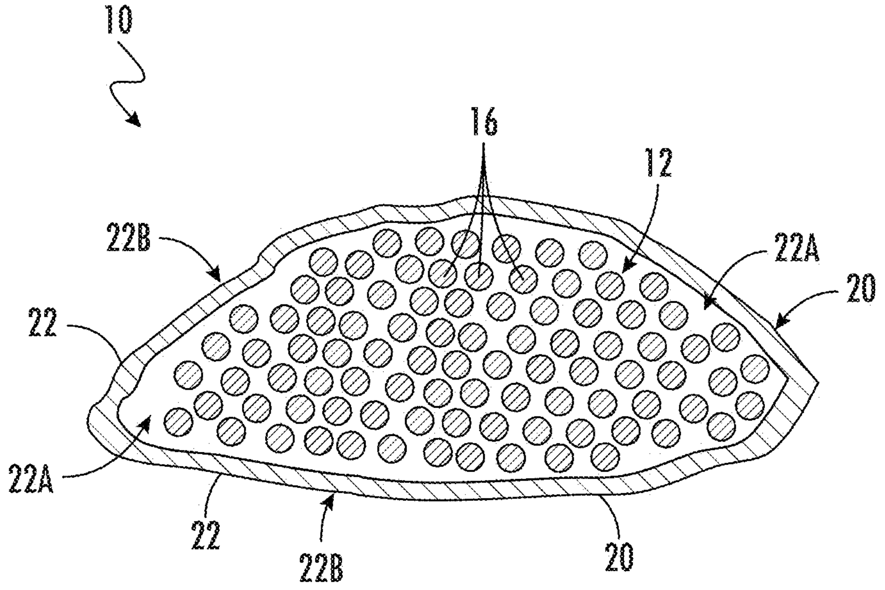
FIG. 3 illustrates a cross-sectional view of a portion of an embodiment of a lifting sling cross-sectioned across against the body of the lifting sling according to the present subject matter.
Figure 4:
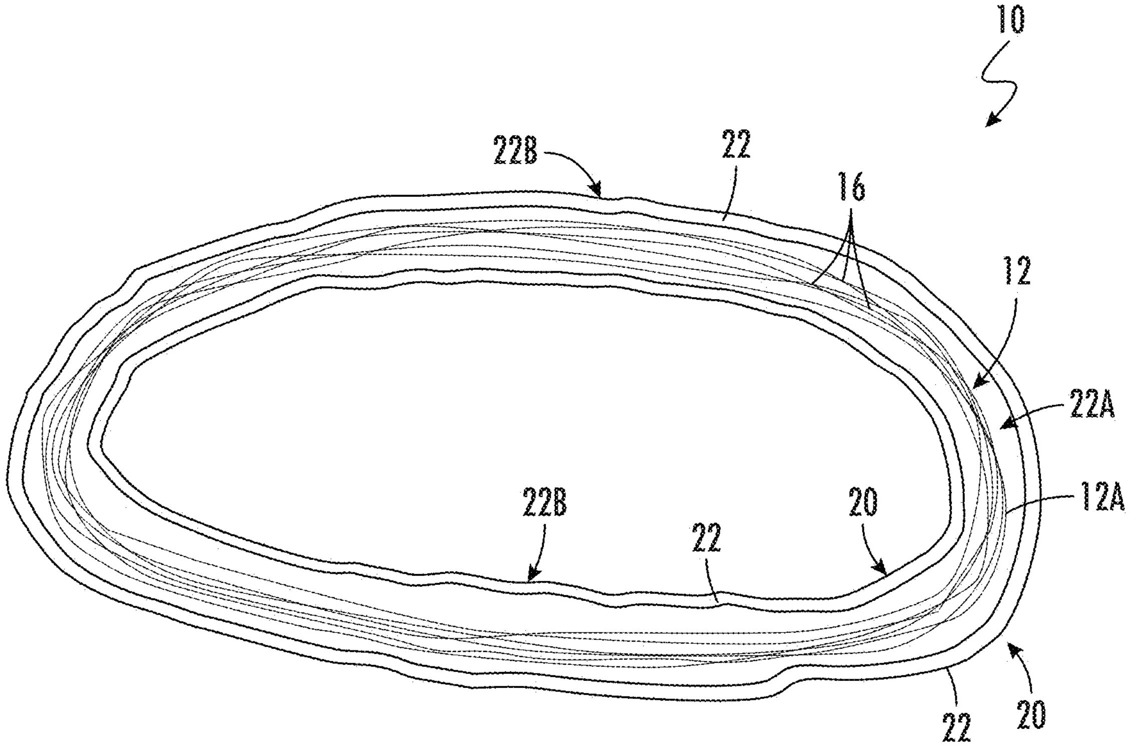
FIG. 4 illustrates a cross-sectional view of a portion of an embodiment of a lifting sling cross-sectioned across with the body of the lifting sling according to the present subject matter.

Referring to FIGS. 1-4, the sling 10 comprises an inner core 12 encased within a protective tubular outer cover 20. The inner core 12 is designed to bear and absorb the strain of the entire weight of any load to be lifted by the lifting sling 10. The inner core 12 can comprise continuous synthetic filaments 16 that form one or more a load-bearing endless loops 12A. The tubular outer cover 20 can loosely surrounding the load-bearing inner core 12 so that the filaments 16 in the inner core 12 are movable relative to each other and to the outer cover 20. For example, the tubular outer cover 20, as shown in FIGS. 3 and 4, can have a tubular interior channel 22A in which the inner core 12 resides that is larger than the load-bearing inner core 12. The outer cover 20 may have various configurations without departing from the scope of the present disclosure. Regardless of the particular configuration of the outer cover 20, the outer cover 20 is configured to allow continuous synthetic filaments 16 of the inner core 12 to move relative to each other and relative to the outer cover 20.

As stated above, the inner core 12 can be made of a single filament or multiple filaments or strands, 16 configured in a plurality of endless parallel loops of filaments to form a single core or multiple cores, all of which are contained inside the protective tubular outer cover 20. The inner core 12 comprising a single core or multiple cores of filaments 16 in this configuration can be typical in the construction of roundslings.

The filaments 16 of the inner core 12 of the slings 10 can comprise one or more synthetic materials, such as thermoplastic polymers. The filaments 16 of the inner core 12 of the slings 10 can comprise one or more synthetic materials, such as polyester, polyethylene, polypropylene, nylon, high molecular weight polyethylene, liquid crystal polymers, aramid, para-aramid or other types of synthetics. For example, the synthetic fibers of the filaments 16 of the inner core comprise at least one of polymers selected from the group comprising nylon, polyester, polyethylene, and polypropylene. The material chosen for the inner core 12 primarily depends on the maximum weight the sling is designed to lift or the maximum force the sling is designed to withstand and the environment in which the sling 10 will be used.

The tubular outer cover 20 of the sling 10 can loosely surround the load-bearing inner core 12 so that when in use, the filaments 16 will bear the load when lifting a heavy object. The tubular outer cover 20 generally does not carry any load when used in rigging projects. The outer cover 20 can comprise a woven fabric 22. For example, the woven fabric 22 of the outer cover 20 can be a tubular woven fabric.

To increase the liquid repellency of the tubular woven fabric 22, the tubular woven fabric 22 can be treated with a liquid repellent solution to make the outer cover 20 of the sling 10 liquid/moisture and oil repellent. For example, in some embodiment, the woven fabric can have one or more surfaces 22B of tubular woven fabric 22 treated with nanoparticles such that the outer cover 20 of the sling 10 becomes liquid/moisture and oil repellent to protect the inner core 12 from damage. For example, a nanoparticle treatment can be used to treat one or more surfaces 22B of tubular woven fabric 22 in a finishing process. In some embodiments, the nanoparticle treatment can be a solution containing nanoparticles that be applied in a treatment process. In some embodiments, the nanoparticle treatment can comprise nanospheres. The nanoparticle treatment can be applied to the one or more surfaces 22B of the tubular woven fabric 22 in a finishing process after the tubular fabric 22 is woven. Once the nanoparticle treatment has been applied, the nanoparticle finish on the surfaces 22B of the tubular woven fabric 22 provide a natural self-cleaning effect and an extremely high level of liquid, dirt and oil repellence. Without wishing to be bound by any particular theory, it is presently believed that the nanoparticle finish on the surfaces 22B of the tubular woven fabric 22 changes the topography of the surfaces 22B of the tubular woven fabric 22 to make it harder for water or other liquids of any kind to reside on and adhere to the treated surfaces 22B. For example, nanospheres in the nanoparticle treatment solution that adhere to the tubular woven fabric 22 during a finishing process can form a nanoparticle finish on the surfaces 22B of the tubular woven fabric 22 that changes the topography of the surfaces 22B of the tubular woven fabric 22.

The outer cover 20 with the nanoparticle finish on the woven fabric 22 can thus be configured to be waterproof (which includes water-resistancy), thereby preventing water or other liquid, including liquid chemicals, from penetrating the outer cover 20 and saturating the inner core 12. If the sling 10 is used around chemicals, the outer cover 20 can prevent the inner core 12 from being exposed to chemicals that may damage or weaken the filaments 16 of the inner core 12. The nanoparticle finish of the surface 22B of the woven fabric 22 of the outer cover 20 can also improve the rinsing characteristics of the sling by lowering the amount of liquid need to rinsing, clean, or remove any contaminants that may come in contact with the sling 10.

Due to the harsh nature of the environments in which the slings 10 are used and the opportunity created by their use to move heavy loads to be damaged during use, the outer protective cover 20 should be durable. Generally speaking, yarn/fiber material used to make the woven fabric 22 can exhibit high tenacity or high abrasion resistance characteristics, or high modulus to improve durability, abrasion resistance and/or cut resistance. The woven fabric 22 of the outer cover 20 can comprise synthetic continuous filament yarns. The synthetic continuous filament yarns of the woven fabric 22 can comprise a thermoplastic polymer. For example, the synthetic continuous filament yarns of the woven fabric 22 can comprise a variety of different synthetic materials, including but not limited to nylon, ultra-high molecular weight polyethylene, liquid crystal polymers, aramid, para-aramid or other types of synthetic materials having similar characteristics. The synthetic continuous filament yarns can be sunlight and heat resistant and should be able to withstand harsh conditions and heavy abrasions. For example, in some embodiments, the woven fabric 22 of the outer cover 20 comprises polyester filament yarns. In particular, the woven fabric 22 of the outer cover 20 can comprise high tenacity and heat and light resistant polyester filament yarns. In some embodiments, the woven fabric 22 of the outer cover 20 can comprise texturized yarns comprising synthetic continuous filament fibers having an increased volume due to texturization.

With the correct selection of fiber and yarn type, the tubular woven fabric weave pattern can also facilitate an increase in the durability and abrasion resistance of the outer cover 20. For example, the weave of the woven fabric 22 of the outer cover 20 can comprise a tubular herringbone weave pattern. In some embodiments, the woven fabric 22 of the outer cover 20 can comprise a tubular herringbone weave pattern with raised ribbing, or raised ribs, 22C. In particular, the raised ribs 22C formed by the weave pattern extend from the fabric surface 22B above portions of the base portion 22D of the woven fabric 22 to provide the distinct and pronounced raised ribs 22C in FIG. 5A.

Figure 5A:
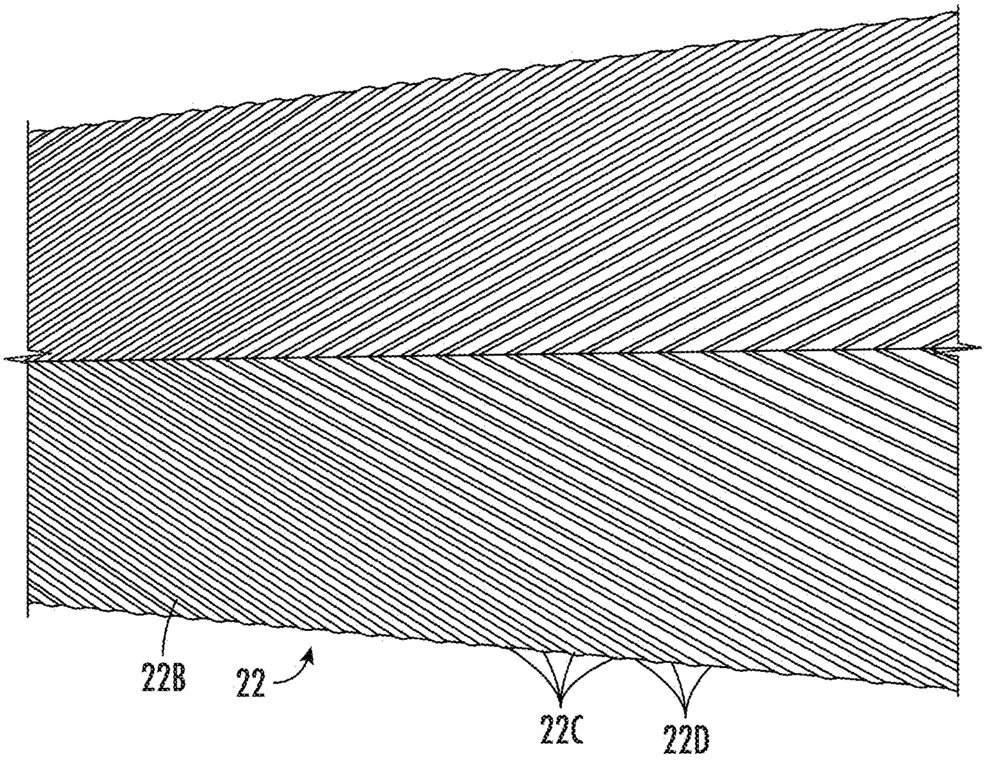
FIG. 5A is an image of a top view of a portion of an embodiment of a tubular woven fabric that can be used in embodiments of an outer cover of a lifting sling according to the present subject matter.
Figure 5B:
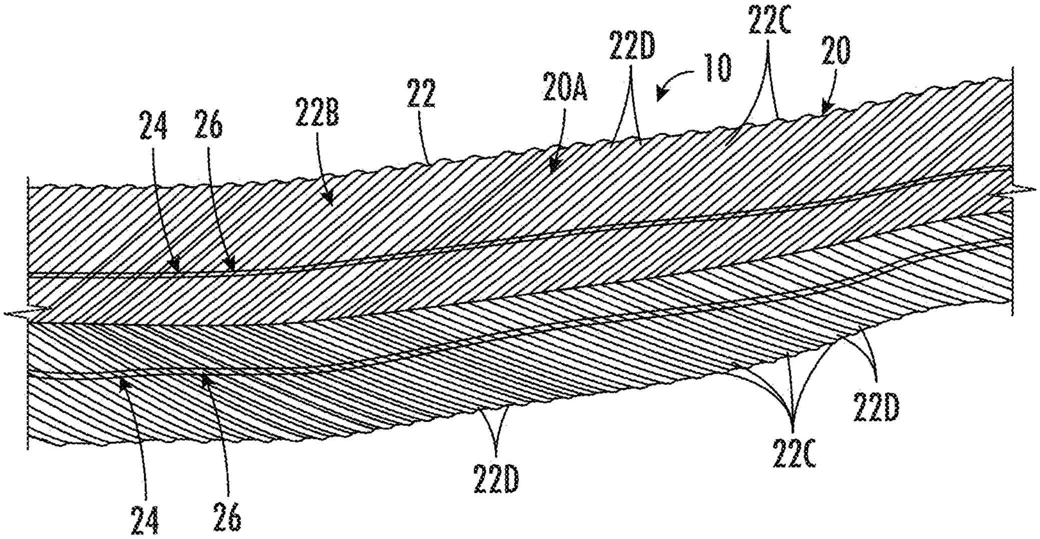
FIG. 5B illustrates a top view of a portion of an embodiment of a lifting sling showing marker yarns and indicator stripes according to the present subject matter.
Figure 6:
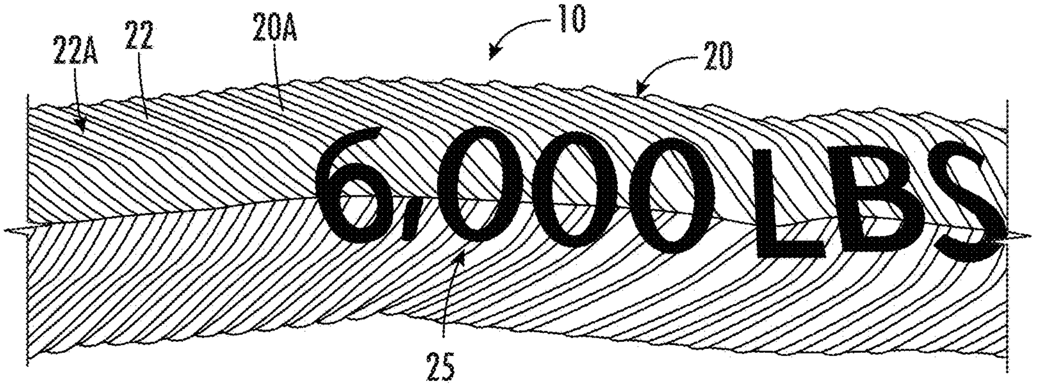
FIG. 6 illustrates a top view of a portion of an embodiment of a lifting sling showing a weight rating indicator according to the present subject matter.

In some embodiments, the weave pattern of the woven fabric 22 of the outer cover 20 can comprise a tubular weave with a face twill of 3 up-1 down-1 up-1 down as seen in FIGS. 5A, 5B and 6. In some embodiments, the woven fabric 22 of the outer cover 20 can comprise about 165 ends per linear inch of 1500/1 polyester. Such tubular weaves can provide a seamless outer cover 20. Such a woven fabric can be especially abrasion resistant and can have a high breaking strength. For example, in some embodiments, the breaking strength of the woven fabric 22 can be about 13,500 lbs. For example, the breaking strength of the woven fabric 22 can be performed using load cell tensile testing methods and machines according to ASTM standards.

To demonstrate the difference that the woven fabric 22 of the outer cover 20 has on the durability and abrasion resistance of the slings 10, samples of woven fabric as described above were tested against conventional standard fabrics use on conventional endless slings. In particular, using the hex bar abrasion test, ASTM test method D6770-07, differently rated conventional standard fabrics used as an outer cover of a lifting sling were tested against similarly rated outer cover fabrics, having a construction similar to the woven fabric 22, comprising texturized 1500/1 polyester yarns with a tubular weave pattern of a face twill of 3 up-1 down-1 up-1 down described above.

Figure 12A:
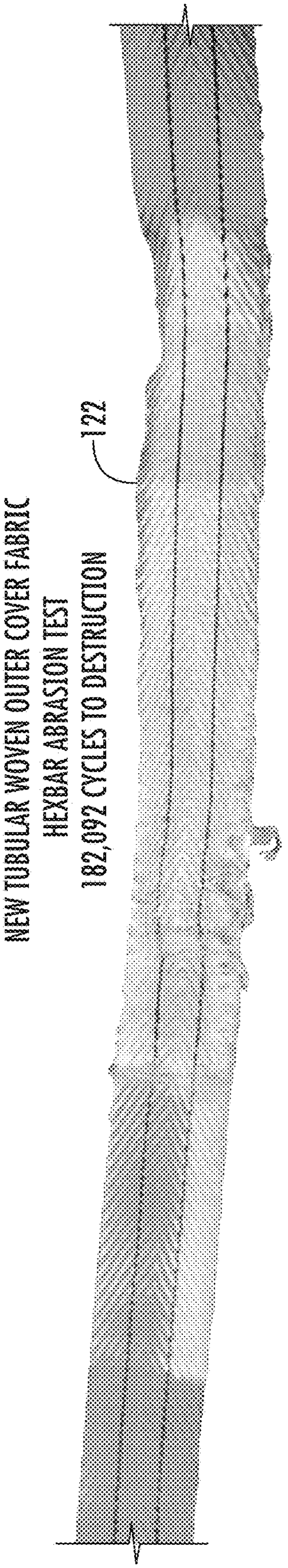
FIG. 12A is an image of an embodiment of a tubular woven fabric according to the present subject matter that has been tested to failure using a hex bar abrasion test, ASTM test method D6770-07, having failed at 181,092 cycles.
Figure 12B:
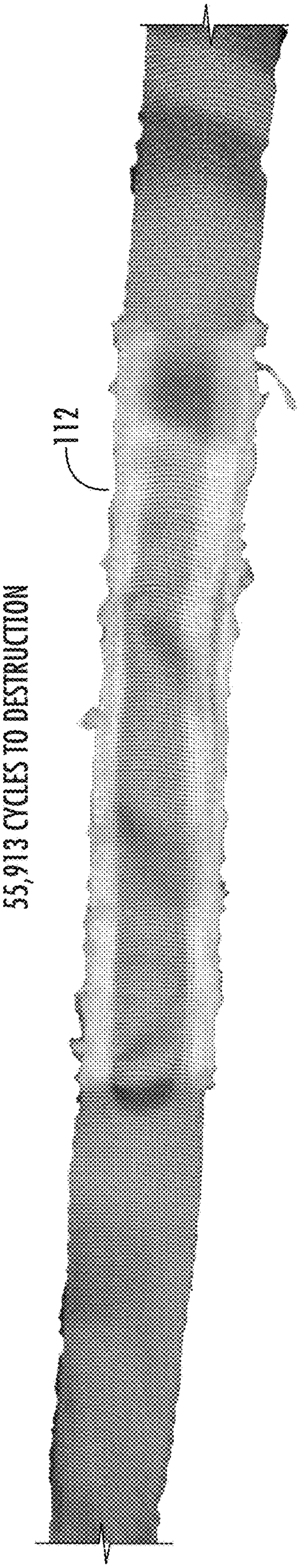
FIG. 12B is an image of an embodiment of a conventional standard fabric used to form the tube of an outer cover currently used in the sling industry that has been tested to failure using a hex bar abrasion test, ASTM test method D6770-07, having failed at 55,913 cycles.

For example, green dyed tubing of a conventional standard fabric used as an outer cover of a sling having about a 1.75 inch width and green tubing of a new woven tubular fabric 22 as described herein used as an outer cover of a sling also having about a 1.75 inch width were tested using the hex bar abrasion test, ASTM test method D6770-07. The results are set forth below in Test 1 of Table 1. The slings using either of the conventional standard fabric and the woven fabric 22 as an outer cover had rated capacities of 5,300 lbs. for vertical lifting sling arrangement, 4,300 lbs. for a choker sling arrangement, and 10,600 lbs. for a basket sling arrangement. FIG. 12A shows an image of the new green tubular woven fabric 122 having a construction and properties as described herein with that was tested to failure using ASTM test method D6770-07. FIG. 12B shows an image of the conventional standard green tubing fabric 112 that was also tested to failure using the same test.

As shown in Test 1 of Table 1, the test results of the conventional standard green tubing fabric 112 used as an outer cover of a sling showed that the conventional standard fabric 112 failed at 55,913 cycles in the hex bar abrasion test, ASTM test method D6770-07. Comparatively, the tubular woven fabric 122 showed little to no wear with little to no effect on tensile strength at that point in its testing. The test results of the green tubular woven fabric 122 showed that the woven fabric 122 failed at 181,092 cycles in the hex bar abrasion test, ASTM test method D6770-07, as set forth in Test 1 of Table 1. A comparison of the results clearer shows that the new tubular woven fabric 122 having a construction and properties as described herein had well over three (3) times and almost four (4) times the durability and abrasion resistance of the conventional standard green tubing fabric used as an outer cover of a sling.

TABLE 1

ABRASION TEST RESULTS
Hex Bar Abrasion Test, ASTM Test Method D6770-07 Test Results

| TEST 1 | | TEST 2 | |
|---|---|---|---|
| FABRIC TYPE | CYCLES | FABRIC TYPE | CYCLES |
| 1¾ GREEN TUBING CONVENTIONAL FABRIC | 55,913 | 3½ BLUE TUBING CONVENTIONAL FABRIC | 80,964 |
| 1¾ GREEN TUBING NEW TUBULAR FABRIC | 181,092 | 1¾ BLUE TUBING NEW TUBULAR FABRIC | 600,000 |

Figure 13A:
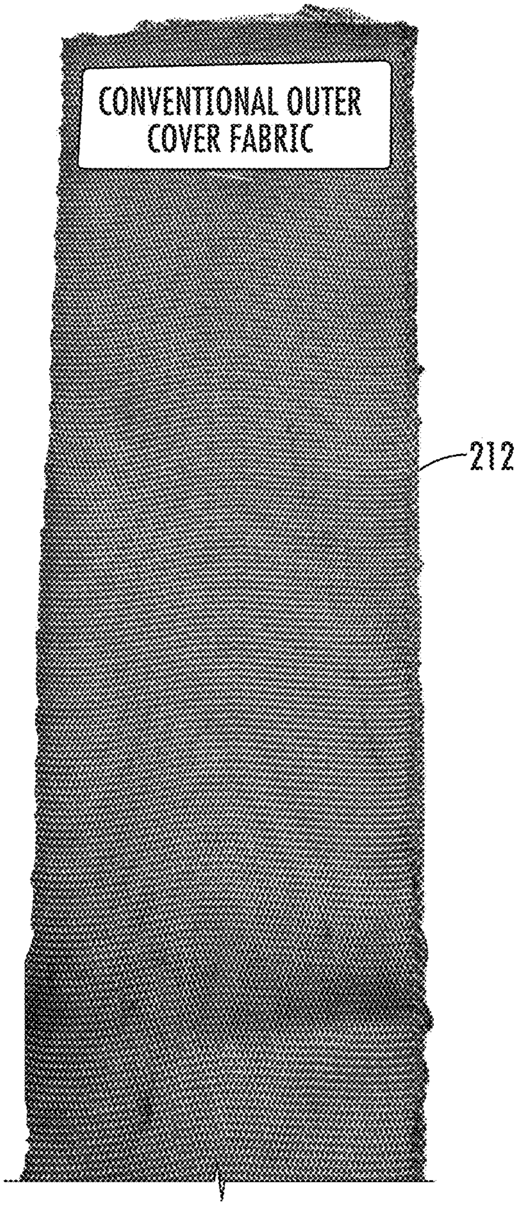
FIG. 13A is an image of an embodiment of a conventional standard fabric used to form the tube of an outer cover currently used in the sling industry before testing for 50,000 cycles using a hex bar abrasion test, ASTM test method D6770-07.
Figure 13B:
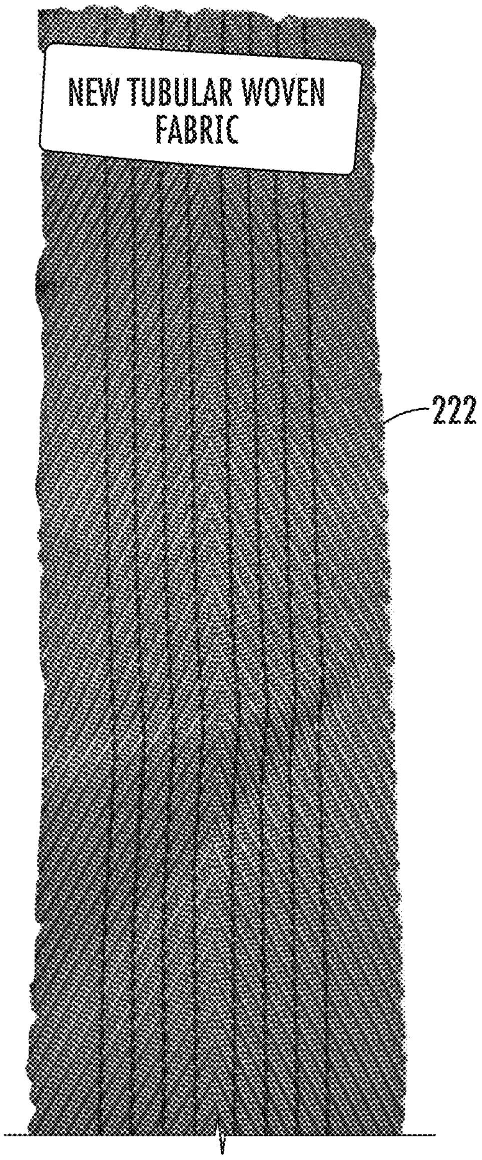
FIG. 13B is an image of an embodiment of a tubular woven fabric according to the present subject matter before testing for 50,000 cycles using a hex bar abrasion test, ASTM test method D6770-07.

TEST 1: 1 ¾ inch Green Poly Tubing Conventional Fabric vs. 1 ¾ inch New Green Poly Tubular Woven Fabric as described herein
TEST 2: 3 ½ inch Blue Poly Tubing Conventional Fabric vs. 3 ½ inch New Blue Poly Tubular Woven Fabric as described herein In another example, blue dyed tubing of a conventional standard fabric 212 used as an outer cover of a sling having about a 3.5 inch width, as shown in FIG. 13A before testing, and blue dyed tubular a woven fabric 222, as shown in FIG. 13B before testing, having a construction and properties as described herein and used as an outer cover of a sling also having about a 3.5 inch width were also tested using the hex bar abrasion test, ASTM test method D6770-07. The results are set forth above in Test 2 of Table 1. The slings using either of the blue tubing conventional standard fabric and the blue tubular woven fabric 22 as the outer cover had rated capacities of 21,200 lbs. for vertical lifting sling arrangement, 17,000 lbs. for a choker sling arrangement, and 42,400 lbs. for a basket sling arrangement.

Figure 13C:
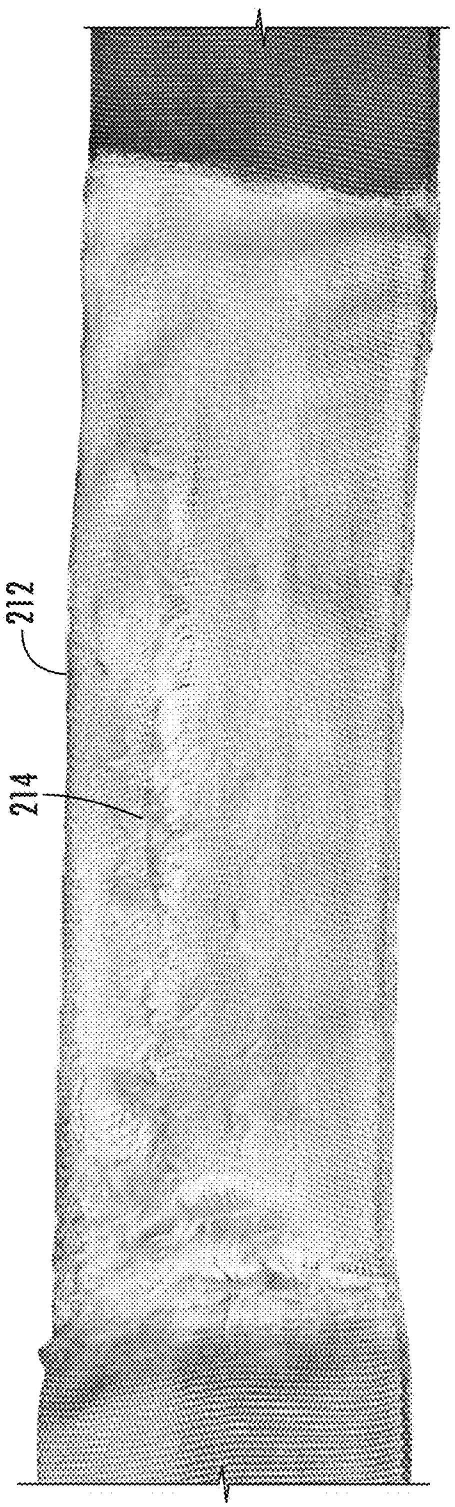
FIG. 13C is an image of an embodiment of a conventional standard fabric used to form the tube of an outer cover currently used in the sling industry after testing for 50,000 cycles using a hex bar abrasion test, ASTM test method D6770-07.

FIG. 13C shows the wear and tear from the testing on the conventional standard fabric 212 at 50,000 cycles. As can be seen, the conventional standard fabric 212 shows significant wear and damage in the testing area 214 and is near failure at this point in the testing. The test results of the conventional standard blue tubing fabric 212 used as an outer cover of a sling showed that the conventional standard fabric 212 failed at 80,964 cycles in the hex bar abrasion test, ASTM test method D6770-07, as shown in Test 2 of Table 1.

Figure 13D:
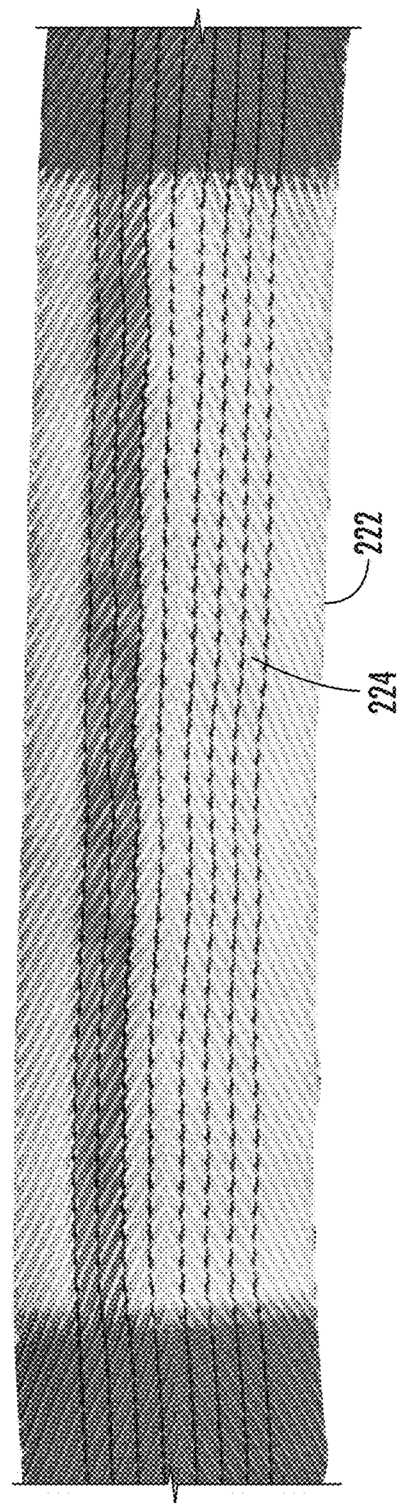
FIG. 13D is an image of an embodiment of a tubular woven fabric according to the present subject matter after testing for 50,000 cycles using a hex bar abrasion test, ASTM test method D6770-07.

FIG. 13D shows the wear and tear from the testing on the new blue tubular woven fabric 222 at 50,000 cycles. As can be seen, the new blue tubular woven fabric 222 shows some superficial wear but shows very little structural wear and still displays very good integrity in the testing area 224 in contrast to the conventional standard fabric 212 at 50,000 cycles. The test results of the new blue tubular woven fabric 222 having a construction and properties as described herein showed that the new blue tubular woven fabric 222 failed at 600,000 cycles in the hex bar abrasion test, ASTM test method D6770-07, as set forth in Test 1 of Table 1, The new blue tubular woven fabric 222 was clearly and excessively superior to the conventional standard blue tubing fabric 212. The new blue tubular woven fabric 222 had well over seven (7) times the durability and abrasion resistance of the conventional standard blue tubing fabric 212 used as an outer cover of a sling.

Thus, the woven fabric 22 as disclosed herein is highly abrasion resistant. Thereby, the outer cover 20 that comprises the tubular woven fabric 22 with its composition, weave pattern and/or finishing treatment provides greater abrasion resistance and protection to the sling 10 than slings using conventional standard outer cover fabrics. The woven fabric 22 of the outer cover 20 also helps prevent physical damage to the inner core 12 from abrasion, sharp edges on the load, etc. The outer cover 20 can also help to reduce damage to the sling 10 and the inner core 12 when it is used in an environment that will subject it to harsh elements such as heat, ultraviolet light, corrosive chemicals, gaseous materials, or other environmental pollutants as well as cold and/or wet environments.

Using an outer cover comprising tubular woven fabric that can comprise texturized 1500/1 polyester yarns having an increased volume due to texturization that are woven in a tight weave in a weave pattern comprising a tubular weave with face twill of 3 up-1 down-1 up-1 down in a herring bone pattern with raised ribs on the outer surfaces of the greatly improves the wear and abrasion resistance of the outer cover. about 165 ends per linear inch of 1500/1 polyester. This is demonstrated by the test results provided above. At the same time due this weave pattern, the tubular woven fabric can have an interior surface on the interior channel that does not the raised ribs thereon providing a smoother interior surface against which the continuous filaments of the inner core may come in contact which can further protect the inner core for abrasion, wear or damage.

Referring to FIG. 5B, in some embodiments, the woven fabric 22 of the outer cover 20 can include marker yarns 24 that can be woven into the woven fabric 22 as shown. The marker yarns 24 can form one or more stripes 26 that are visible on an outer surface 20A of the outer cover 20, which can be the outer surface 22B of the woven fabric 22. Each stripe 26 can signify a specified weight amount of a lifting rating of the lifting sling 10. For example, in some embodiments, each stripe 26 in the outer surface 20A of the outer cover 20 can represent about 3,000 lbs. of inner core breaking strength, i.e., lifting capability, within the sling 10. As shown in FIGS. 1 and 5B, the outer surface 20A of the outer cover 20 can have one or more stripes. As shown in FIG. 6, the sling 10 can also have a weight rating indicator 25 printed on the outer cover surface 20A.

Figure 7:
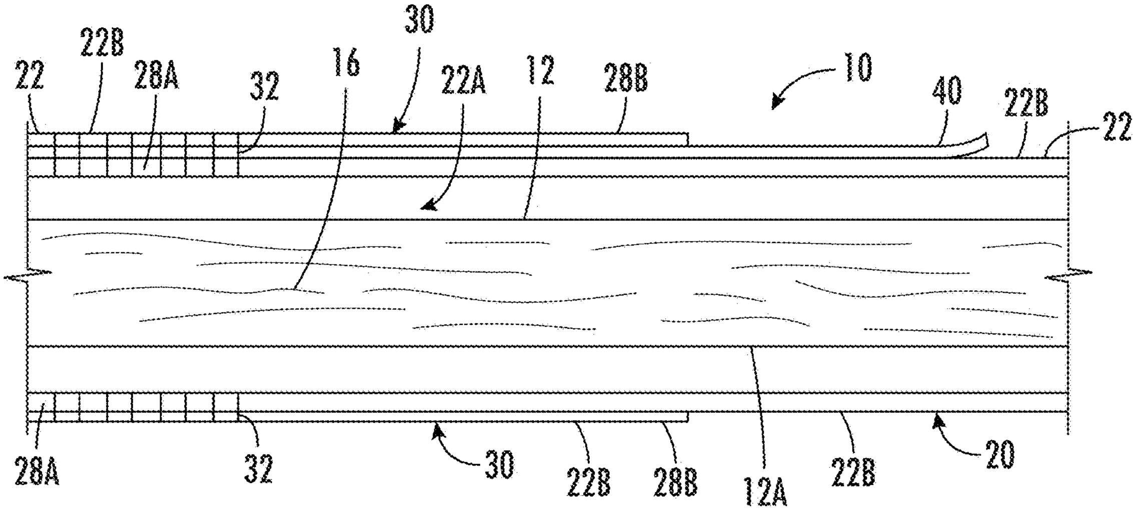
FIG. 7 illustrates a cross-sectional view of a portion of an embodiment of a lifting sling showing an overlap of the ends of an outer cover according to the present subject matter.
Figure 8:
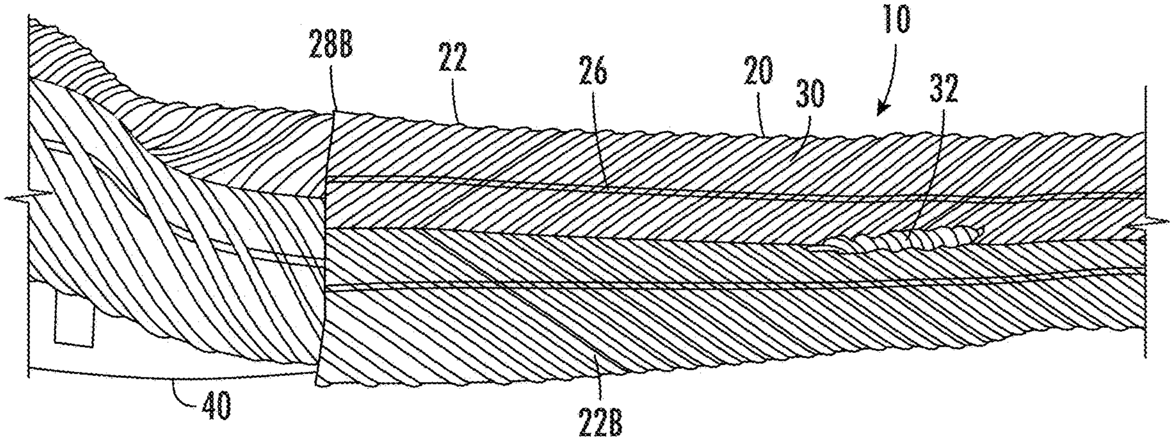
FIG. 8 illustrates a top view of a portion of an embodiment of a lifting sling showing an overlap of the ends of an outer cover with a securement element according to the present subject matter.
Figure 9:
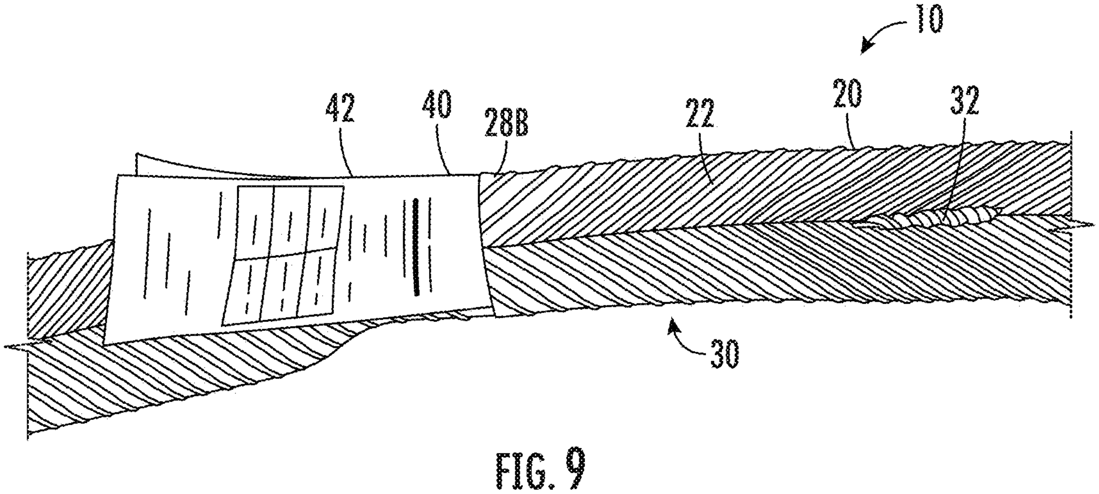
FIG. 9 illustrates a top view of a portion of an embodiment of a lifting sling showing a twin tag according to the present subject matter.
Figure 10:
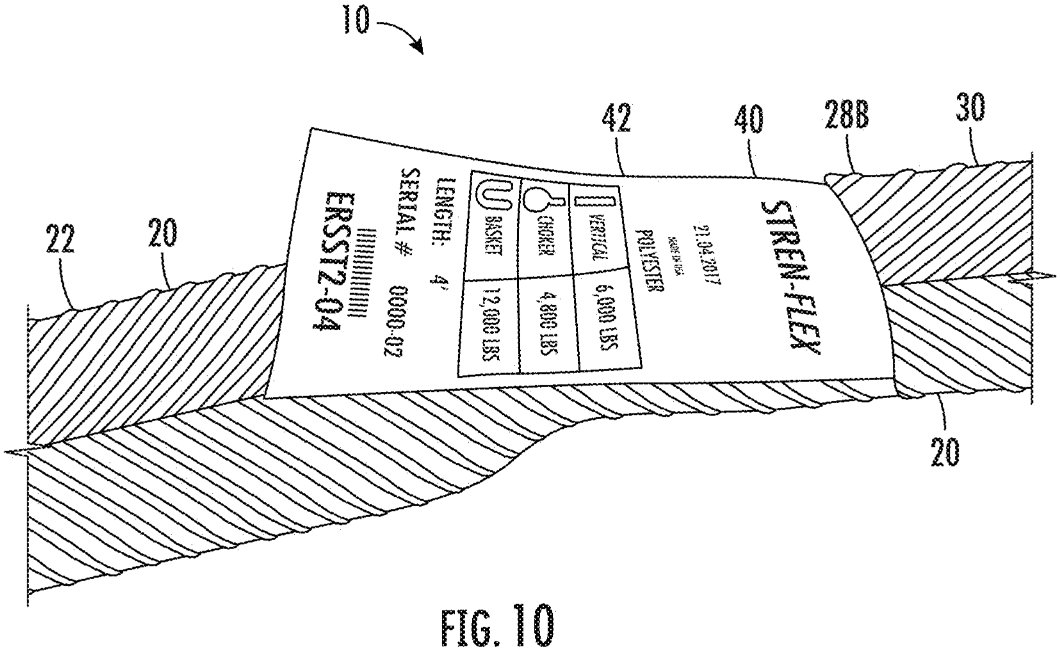
FIG. 10 illustrates a top view of a portion of an embodiment of a lifting sling showing a twin tag according to the present subject matter.

Referring to FIGS. 7-11B, the woven fabric 22 of the outer cover 20 can comprise a woven tubular fabric having an interior tubular channel 22A and a first end 28A and second end 28B. Within the sling 10, the inner core 12 resides in the interior tubular channel 22A as shown in FIG. 7. The first end 28A of the tubular woven fabric 22 is place in and resides inside the second end 28B forming an overlap 30 of the woven tubular fabric 22 to form the outer cover 20 of the sling 10. In this manner, end 28B can effectively operate as a sleeve. A securement element 32 can be used to secure the first end 28A of the woven tubular fabric 22 to the second end 28B of the woven tubular fabric 22 at the overlap 30. In some embodiments, the securement element 32 can comprise securement stitching as shown in FIG. 8.

Figure 11B:
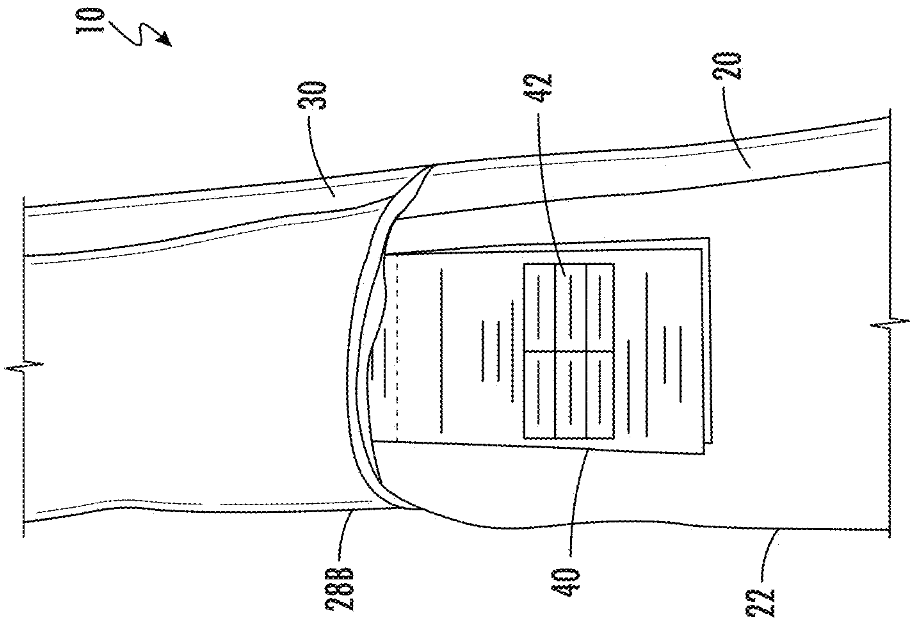
FIGS. 11A and 11B illustrate top views of a portion of an embodiment of a lifting sling showing the first and second documentation areas of a twin tag according to the present subject matter; and RAISED RIBBED add to the abrasion resistance herringbone angular textured polyester yarn
Figure 11A:
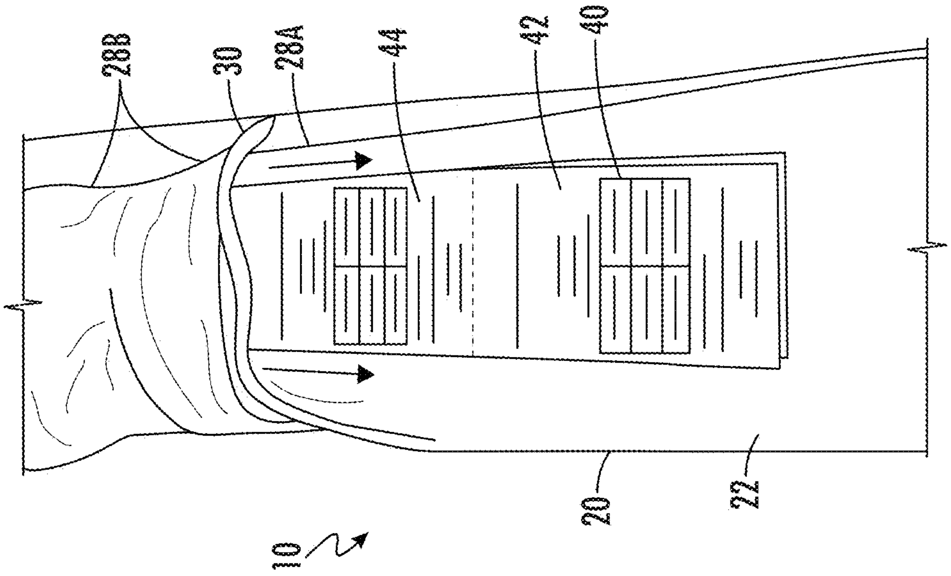

In some embodiments, the lifting sling 10 can also comprise a twin tag 40 as shown in FIGS. 9-11B. The twin tag 40 can comprise a first documentation area 42 and a second documentation area 44 thereon as shown in FIG. 11A. Both the first documentation area 42 and the second documentation area 44 can have technical and specification data printed thereon. In particular, the documentation areas 42, 44 can create a redundancy by having the same technical and specification data printed thereon. The twin tag 40 can be secured to the lifting sling 10 at the overlap 30 with the first documentation area 42 residing on the outside of the outer cover 20 and the second documentation area 44 residing within the overlap 30 of the first and second ends 28A, 28B of the woven tubular fabric 22 of the outer cover 20 as shown in FIG. 11B such that the second end 28B movably covers the second documentation area 44 as shown in FIGS. 11A and 11B. The first documentation area 42 can be easily accessed as needed to inform the user of the sling 10 of needed technical specifications. The first documentation area 42, however, is exposed to the possibility of damage and printing will wear out and become faded over time during use and exposure to sunlight. The second documentation area 44, while not as easily accessible, is protected by the overlap 30 to better preserve the technical information printed thereon. By using the twin tag 40 with the first documentation area 42 that is easily accessible to easily provide needed information about the sling 10 and the second documentation area 44 that is protected, a redundancy is provided that allows the user to still have access to the technical information about the sling 10 in case the first documentation area 42 becomes unreadable through damage or normal wear.

While the introduction of water to the inner core 12 does not necessarily always affect the strength of the core, the absorption of water in the inner core 12 causes the unwanted result of the inner core 12 and sling 10 becoming heavier due to the weight of the water absorbed. In various applications, the sling 10 must be handled and manipulated on site. In order for the sling 10 to be handled and manipulated properly, the weight and flexibility of the sling 10 must be maintained essentially the same as when the sling was new. Therefore, in harsh environments or in surroundings in which water is present, if the inner core 12 is allowed to become saturated, the weight of the sling 10 will increase significantly, making it more difficult for a user/operator to transport or manipulate the sling 10. In addition, in environments where the sling 10 is exposed to extreme cold temperatures, any water absorbed into the inner core 12 will freeze, making it more difficult for the user/operator to manipulate the sling 10, as the sling 10 will become rigid due to the formation of ice, rather than remaining flexible. Any ice within the interior channel 22A of the outer cover 20 can also damage the inner core 12, especially if placed under heavy weight.

In addition, in environments in which the sling 10 is exposed and possibly submerged in chemicals, the outer cover 20 prevents the inner core 12 from absorbing the chemical liquids. This ensures that the load-bearing inner core 12 will not be exposed to chemicals. The use of the outer cover 20 also improves the rinsing characteristics of the sling 10, as the amount of water or rinsing or buffering liquids that are required to remove the chemical liquids form the sling 10 is reduced, thereby reducing the drying time of the sling 10.

As set forth above and further below, methods of making a lifting sling are also provided. The method can include providing a tubular woven fabric having an outer surface and an interior tubular channel. The tubular woven fabric can be treated with nanoparticles to make the outer surface of the tubular woven fabric liquid and moisture repellent. The tubular woven fabric can be cut to form an outer cover for a lifting sling such that the outer cover has a length, an interior channel, a first end and a second end. Continuous synthetic filaments can then be inserted into the interior channel of the outer cover to form an inner core of one or more load-bearing endless loops. For a roundsling, the first end of the outer cover can be inserted into the interior channel at the second end of outer cover to form an overlap of the woven tubular fabric on the outer cover such that the inner core is completely covered by the outer cover. The second end of the outer cover can then be secured to the first end of the outer cover at a point along the overlap, as described above for example. The outer cover loosely surrounds the inner core so that the continuous synthetic filaments of the inner core are movable relative to each other and to the outer cover. The securing of the first and second ends of the outer cover can be accomplished in manner so that the continuous synthetic filaments of the inner core is not damaged by the securement method.

In some embodiments, the tubular woven fabric can comprise texturized 1500/1 polyester yarns having an increased volume due to texturization with the tubular weave pattern of the woven fabric comprising a tubular weave with face twill of 3 up-1 down-1 up-1 down that provides increased abrasion resistance. This weave pattern with the yarns used therein can form raised ribs along the outer surface of the tubular woven fabric.

In some embodiments, the step of providing a tubular fabric can comprises weaving the tubular woven fabric. In some embodiments, the step of weaving the tubular woven fabric comprises weaving in marker yarns into the tubular woven fabric to form one or more stripes that are visible on the outer surface of the woven tubular fabric. Once the stripes are woven into the tubular woven fabric, each stripe can be used to signify a specified weight amount of a rating of the lifting sling on the outer cover of the lifting sling. Further, the step of providing a tubular fabric can comprises treating the tubular woven fabric with a solution comprising nanoparticles in a finishing process such that, once the tubular woven fabric is treated with the solution of the nanoparticle treatment, the tubular woven fabric is liquid and moisture repellent. As outlined above, these nanoparticles can comprise nanospheres.

In some embodiments, the method can comprise securing a twin tag at the overlap of the first and second ends of the outer cover. The twin tags can that comprises a first documentation area and a second documentation area thereon. Both the first documentation area and the second documentation area of the twin tag can have the same technical and specification data printed thereon. The twin tag can be secured at the overlap in such a manner that the first documentation area resides on the outside of the outer cover and the second documentation area resides within the overlap of the first and second ends of the outer cover such that the second end of the outer cover covers the second documentation area but can be move upward as need to expose the second documentation.

Other method steps and other methods are provided above and are readily apparent to one of ordinary skill in the art based on the disclosure herein.

These and other modifications and variations to the present subject matter may be practiced by those of ordinary skill in the art, without departing from the spirit and scope of the present subject matter, which is more particularly set forth herein above. In addition, it should be understood the aspects of the various embodiments may be interchanged both in whole and in part. Furthermore, those of ordinary skill in the art will appreciate that the foregoing description is by way of example only, and is not intended to limit the present subject matter.

What is claimed is:

1. A lifting sling comprising:

an inner core comprising continuous synthetic filaments that form one or more load-bearing endless loops; and a tubular outer cover loosely surrounding the inner core so that the filaments of the inner core are movable relative to each other and to the outer cover, the outer cover comprising a woven fabric and the woven fabric being treated with nanoparticles to make the outer cover liquid and moisture repellent to protect the inner core from damage, wherein the nanoparticles adhere to a treated surface of the tubular woven fabric during a finishing process that changes a topography of the treated surface of the tubular woven fabric.

2. The lifting sling as recited in claim 1, wherein synthetic fibers of the filaments of the inner core comprise at least one of polymers selected from the group comprising nylon, polyester, polyethylene, and polypropylene.

3. The lifting sling according to claim 1, wherein the weave of the woven fabric of the outer cover comprises a tubular weave with a face twill of 3 up-1 down-1 up-1 down and the woven fabric of the outer cover comprises high tenacity and heat and light resistant polyester filament yarns that have been texturized.

4. The lifting sling according to claim 3, wherein the tubular woven fabric creates a herringbone pattern with raised ribs.

5. The lifting sling according to claim 1, wherein the woven fabric of the outer cover comprises texturized yarns comprising synthetic continuous filament fibers having an increased volume due to texturization.

6. The lifting sling according to claim 1, wherein the woven fabric of the outer cover comprises marker yarns woven into the woven fabric that forms one or more stripes that are visible on an outer surface of the outer cover, each stripe signifying a specified weight amount of a rating of the lifting sling.

7. The lifting sling according to claim 1, wherein the woven fabric of the outer cover comprises a woven tubular fabric having an interior tubular channel and a first end and second end with the inner core residing in the interior tubular channel and the first end residing inside the second end forming an overlap of the woven tubular fabric to form the outer cover; and further comprising a securement element that secures the first end of the woven tubular fabric to the second end of the woven tubular fabric at the overlap.

8. The lifting sling according to claim 7, further comprising a twin tag that comprises a first documentation area and a second documentation area thereon, both the first documentation area and the second documentation area having the same technical and specification data printed thereon, the twin tag being secured to the lifting sling with the first documentation area residing on the outside of the outer cover and the second documentation area residing within the overlap of the first and second ends of the woven tubular fabric of the outer cover such that the second end movably covers the second documentation area.

9. The lifting sling according to claim 1, wherein the nanoparticles comprise nanospheres.

10. A lifting sling comprising:

an inner core comprising continuous synthetic filaments that form one or more load-bearing endless loops; and a tubular outer cover loosely surrounding the inner core so that the filaments of the inner core are movable relative to each other and to the outer cover, the outer cover comprising a tubular woven fabric comprising texturized 1500/1 polyester yarns having an increased volume due to texturization, wherein the tubular weave pattern of the woven fabric comprises a tubular weave with face twill of 3 up-1 down-1 up-1 down that provides increased abrasion resistance and the woven fabric of the outer cover has an abrasion resistance that withstands at least about 180,000 cycles using the hex bar abrasion test, ASTM test method D6770-07.

11. The lifting sling according to claim 10, wherein the woven fabric being treated with a nanoparticle treatment to make the outer cover liquid and moisture repellent to protect the inner core from damage.

12. The lifting sling according to claim 10, wherein the woven fabric has a breaking strength of 13,500 lbs.

13. The lifting sling according to claim 10, wherein the woven fabric of the outer cover comprises a woven tubular fabric having an interior tubular channel and a first end and second end with the inner core residing in the interior tubular channel and the first end residing inside the second end forming an overlap of the woven tubular fabric to form the outer cover; and further comprising a securement element that secures the first end of the woven tubular fabric to the second end of the woven tubular fabric at the overlap.

14. The lifting sling according to claim 10, wherein the woven fabric of the outer cover has an abrasion resistance that withstands at least about 500,000 cycles using the hex bar abrasion test, ASTM test method D6770-07.

15. A method of making a lifting sling, the method comprising:

providing a tubular woven fabric having an outer surface and an interior tubular channel, the tubular woven fabric being treated with nanoparticles to make the outer surface of the tubular woven fabric liquid and moisture repellent, wherein the tubular woven fabric comprises texturized 1500/1 polyester yarns having an increased volume due to texturization, wherein the tubular weave pattern of the woven fabric comprises a tubular weave with face twill of 3 up-1 down-1 up-1 down that provides increased abrasion resistance;

cutting the tubular woven fabric to form an outer cover for a lifting sling such that the outer cover has a length, an interior channel and a first end and a second end;

inserting continuous synthetic filaments into the interior channel of the outer cover to form an inner core of one or more load-bearing endless loops;

inserting the first end of the outer cover into the interior channel at the second end of outer cover to form an overlap of the woven tubular fabric on the outer cover such that the outer cover loosely surrounds the inner core so that the continuous synthetic filaments of the inner core are movable relative to each other and to the outer cover;

securing the second end of the outer cover to the first end of the outer cover at a point along the overlap in manner that does not damage the continuous synthetic filaments of the inner core; and providing a tubular fabric comprises treating the tubular woven fabric with a solution comprising nanoparticles in a finishing process.

16. The method according to claim 15, wherein the step of weaving the tubular woven fabric comprises weaving in marker yarns into the tubular woven fabric to form one or more stripes that are visible on the outer surface of the woven tubular fabric, each stripe signifying a specified weight amount of a rating of the lifting sling on the outer cover of the lifting sling.

17. The method according to claim 15, further comprising securing a twin tag that comprises a first documentation area and a second documentation area thereon at the overlap of the first and second ends of the outer cover such that the first documentation area resides on the outside of the outer cover and the second documentation area resides within the overlap of the first and second ends of the outer cover such that the second end movably covers the second documentation area.

* * * * *